(12) United States Patent
Burnett et al.

(10) Patent No.: US 6,297,447 B1
(45) Date of Patent: Oct. 2, 2001

(54) GROUNDING DEVICE FOR COAXIAL CABLE

(75) Inventors: Jason T. Burnett, Westland; Hiroshi Umemoto, Beverly Hills; Toshitaka Tezuna, Novi, all of MI (US)

(73) Assignee: Yazaki North America, Inc.

( * ) Notice: Subject to any disclaimer, the term of this patent is extended or adjusted under 35 U.S.C. 154(b) by 0 days.

(21) Appl. No.: 09/533,332

(22) Filed: Mar. 23, 2000

(51) Int. Cl.[7] .................................................. H02G 7/00
(52) U.S. Cl. .................. 174/40 CC; 174/65 R; 174/78; 174/88 C; 439/98
(58) Field of Search .................. 174/75 C, 78, 174/88 C, 40 CC, 51, 65 R, 135; 439/98, 99, 100

(56) References Cited

U.S. PATENT DOCUMENTS

| | | | |
|---|---|---|---|
| 2,411,018 | * 11/1946 | Benander | 439/98 |
| 3,568,128 | * 3/1971 | Taylor | 439/98 |
| 3,892,455 | * 7/1975 | Sotolongo | 439/100 |
| 4,875,864 | 10/1989 | Campbell . | |
| 4,892,491 | 1/1990 | Budano, II et al. . | |
| 5,122,068 | * 6/1992 | Koss | 439/98 |
| 5,164,545 | * 11/1992 | Kreinberg et al. | 174/94 R |
| 5,246,378 | 9/1993 | Seiceanu . | |
| 5,281,762 | * 1/1994 | Long et al. | 174/78 |
| 5,545,848 | * 8/1996 | Lin | 174/52.1 |
| 5,606,150 | 2/1997 | Radliff et al. . | |
| 5,850,056 | * 12/1998 | Harwath | 174/40 CC |
| 6,011,218 | * 1/2000 | Burek et al. | 174/40 CC |

OTHER PUBLICATIONS

Toyota, "Bracket with 3 metal strips", Aug., 1996.
Yazaki Corporation, "Earth Terminal", Drawing No. 7158–7278–12:M, Jul. 7, 1997.

* cited by examiner

Primary Examiner—Dean A. Reichard
Assistant Examiner—Adolfo Nino
(74) Attorney, Agent, or Firm—Young & Basile

(57) ABSTRACT

A ground connection bracket for securing coaxial cables to a grounding surface of, for example, a motor vehicle, includes first and second clamping members connected along a common edge by an integral hinge. Each of the clamping members is composed of a generally flat, rectangular panel and has two parallel side walls extending therefrom along edges perpendicular to the hinge edge. At least one contact projects from the panel of each clamping member, and generally semi-circular notches are formed in the side walls of the clamp members adjacent the contacts. A hole passes through the panel of one of the clamp members to receive a bolt for fastening the bracket to a grounding surface. One or more coaxial cables to be grounded are inserted between the clamping members so as to extend through the notches. A short length of insulation on each cable is stripped to expose the shield where the cables pass through the bracket. The clamping members are then bent relative to one another about the hinge, the side walls overlapping one another such that the notches therein grip the outer insulation of the cable and the contacts being urged against opposite sides of the exposed shield. The contacts are soldered to the shield to provide a reliable and long-lasting electrical connection.

17 Claims, 2 Drawing Sheets

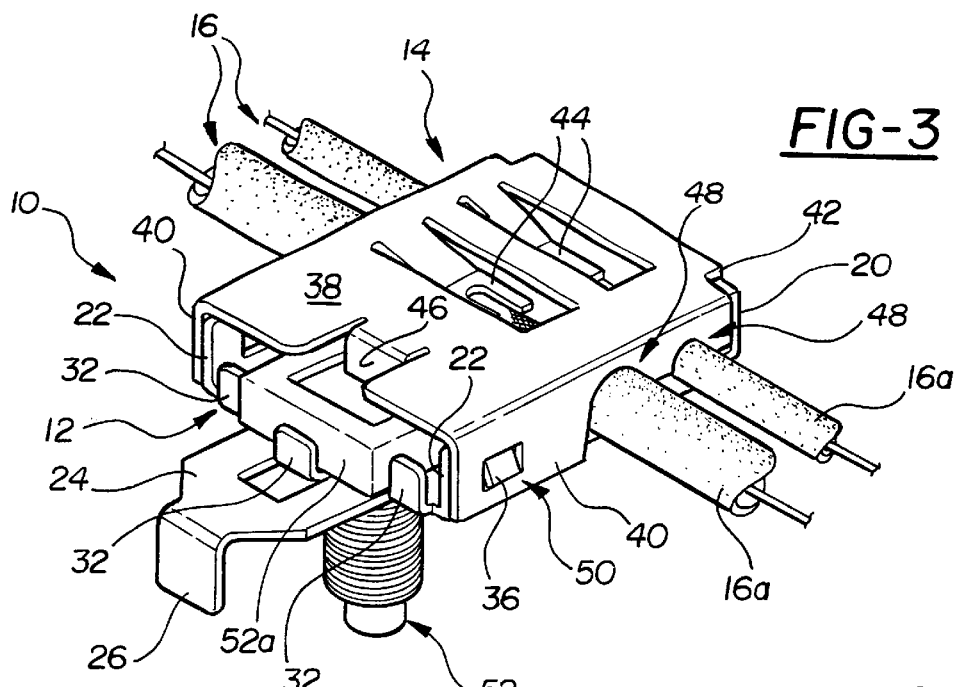
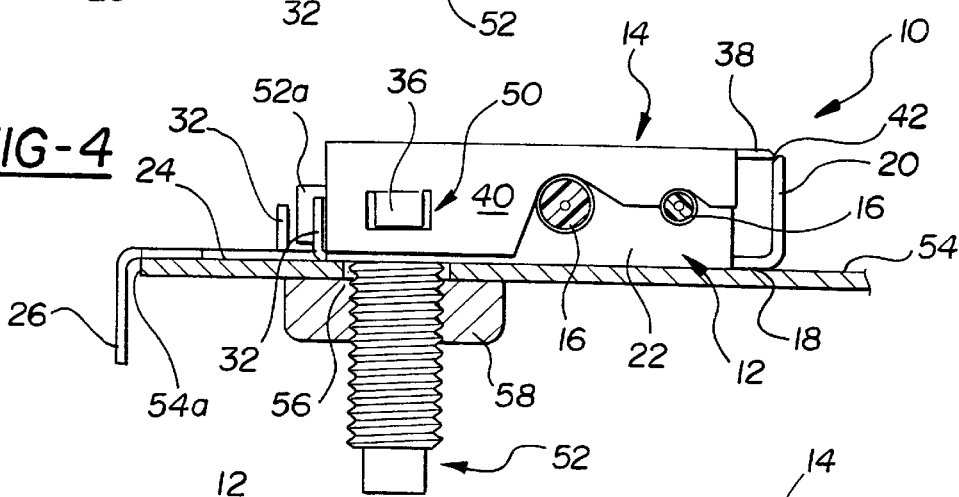
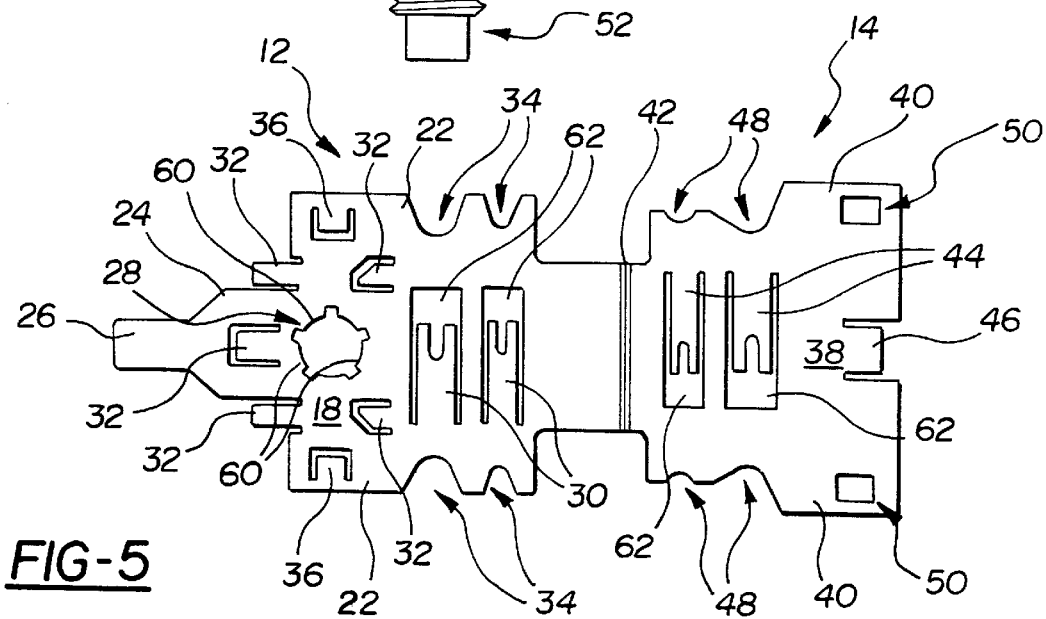

GROUNDING DEVICE FOR COAXIAL CABLE

FIELD OF THE INVENTION

The invention relates to brackets used to electrically ground coaxial cables.

BACKGROUND OF THE INVENTION

Coaxial cables are used in vehicles to transmit signals received by an antenna. The outer conductor of the cable, commonly known as the shield, is usually connected to an electrical ground. It is known to ground the shield by crimping a terminal around the cable such that a sharp contact portion of the terminal cuts through the outer insulation to contact the shield. The terminal is then bolted to a grounding surface. It is often difficult to achieve a reliable grounding connection using this method, and the crimping process has been shown to damage the coaxial cable.

Another known grounding bracket has three metal tabs which are bent around the cable at spaced intervals. The insulation is removed from a short section of the cable so that the center tab may be soldered to the cable shield. The two outer tabs are bent around the cable to tightly grip the insulation so that the soldered joint is not subjected to stress. This type of connection has been found to be unreliable because the outer tabs tend to loosen their grip on the cable over time so that the soldered connection can break.

SUMMARY OF THE INVENTION

The invention is a ground connection bracket for use with one or more coaxial cables which offers improved reliability of the electrical connection and reduced likelihood of damage to the cables. These objectives are achieved by a bracket having two clamping members connected by a hinge such that they may be squeezed together around the cables to grip them. Contacts are disposed on the clamping members to contact conductive portions of the cables and the bracket is secured to the electrical ground.

In the illustrative embodiment of the invention disclosed herein, the first and second clamping members are connected along a common edge by an integral living hinge. Each of the clamping members is composed of a generally flat, rectangular panel and has two parallel side walls extending therefrom along edges perpendicular to the hinge edge. At least one contact projects from the panel of each clamping member, and generally semi-circular notches are formed in the side walls of the clamp members adjacent the contacts. A hole passes through the panel of one of the clamp members to receive a bolt for fastening the bracket to a grounding surface.

One or more coaxial cables are inserted between the clamping members so as to extend through the notches. A short length of insulation on each cable is stripped to expose the shield where the cables pass through the bracket. The clamping members are then bent relative to one another about the hinge, the side walls overlapping one another such that the notches therein grip the outer insulation of the cable and the contacts are urged against opposite sides of the exposed shield. The contacts are then soldered to the shield. The grip of the notches on the cable insulation acts as a strain relief, isolating the soldered connection between the shield and the contact from physical stresses to provide a reliable and long-lasting electrical connection.

In the preferred embodiment of the invention, a plurality of locator tabs are formed integrally with the clamp members to engage the bolt head and so prevent the bolt from turning relative to the bracket as a nut is threaded onto the bolt to fasten it to the grounding surface. This allows the bracket to be secured to a grounding panel with one hand if necessary.

The bracket is preferably formed from a single piece of conductive metal which is stamped and bent to the described configuration, thereby enabling the bracket to be fabricated economically.

Other objects, advantages and applications of the present invention will become apparent to those skilled in the art when the following description of a preferred embodiment of the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a perspective view of the bracket in a closed condition;

FIG. 4 is a side view of the closed bracket; and

FIG. 5 is a top view of a metal stamping prior to being folded into the configuration of the bracket of FIGS. 1–4.

DETAILED DESCRIPTION OF THE PREFERRED EMBODIMENT

Figure 1:
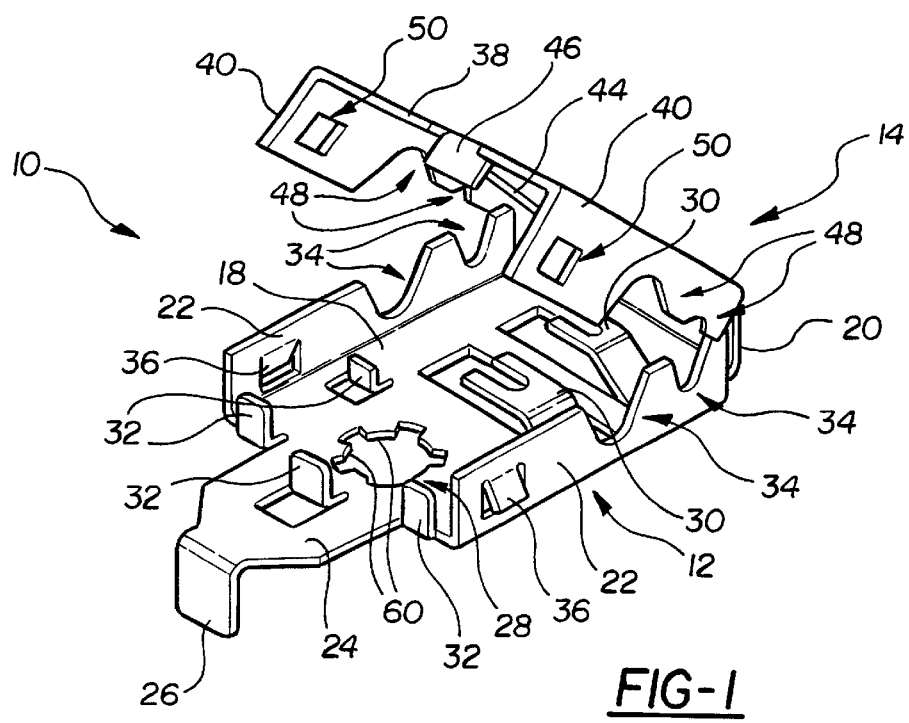
FIG. 1 is a perspective view of a grounding bracket according to the present invention.
Figure 2:
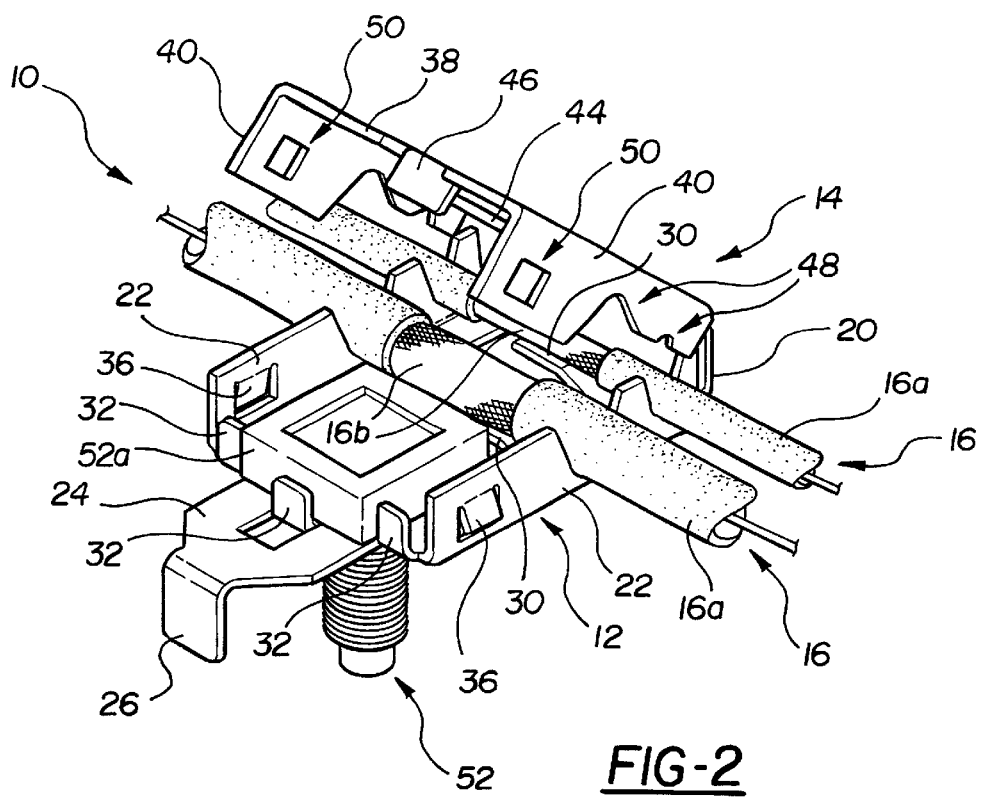
FIG. 2 is a perspective view of the bracket in FIG. 1 with two coaxial cables and a bolt positioned within the bracket.

As seen in FIGS. 1–5, a grounding bracket 10 according to the present invention generally comprises two clamping members, hereinafter referred to as a base 12 and a cover 14, connected along a common edge. Bracket 10 is initially fabricated in an open configuration, with base 12 and cover 14 forming an acute angle as shown in FIGS. 1 and 2, and is later bent to a closed configuration to grip coaxial cables 16 as shown in FIGS. 3 and 4.

Base 12 comprises a bottom panel 18, an end wall 20, and side walls 22. An arm 24 extends outwardly from base 12 opposite end wall 20 and a hook 26 projects downwardly from the distal end of the arm. A bolt receiving hole 28 is formed in base 12 adjacent arm 24. First and second contacts 30 have distal ends generally parallel to but elevated above the plane defined by bottom panel 18. Locator tabs 32 extend upwardly from base 12 at positions surrounding bolt receiving hole 28, and are also preferably formed by cutting and bending the base at the desired locations.

Two generally semi-circular cable-receiving notches 34 are formed in each of side walls 22 in approximate alignment with contacts 30. Locking tabs 36 project outwardly from side walls 22 at a shallow angle.

Cover 14 comprises a top panel 38 and first and second side walls 40. Top panel 38 is joined to end wall 20 of base 12 by a living hinge 42 (see FIG. 4), in the illustrated embodiment a line of reduced wall thickness extending across end wall 20. Two contacts 44 have distal ends generally parallel to and spaced from top panel 38, and are generally similar in configuration to contacts 30 on base 12. A bolt retention tab 46 extends downwardly from the outer end of top panel 38 opposite hinge 42.

Two cable-receiving notches 48 are formed in each of side walls 40, aligned with contacts 44. Side walls 40 are of reduced height at their ends adjacent hinge 42, so that cable-receiving notches 48 are shallower than cable-receiving notches 34 in side walls 22 of base 12. Apertures 50 are formed in side walls 40 adjacent the ends opposite hinge 42 to mate with locking tabs 36.

First and second coaxial cables 16 are of the type commonly used for the transmission of electrical signals, having a layer of insulation 16a over a woven wire shield 16b. As best seen in FIG. 2, each cable 16 is prepared for use with bracket 10 by removing insulation 16a at an intermediate location to expose a portion of shield 16b. The exposed portion of shield 16b is preferably shorter than the distance between bracket side walls 22. Cables 16 are placed on base 12 such that they are received by respective cable-receiving notches 34 with exposed shields 16b directly over the respective contacts 30. A bolt 52 is inserted through bolt receiving hole 28 in base 12, a head 52a of the bolt fitting between locator tabs 32 as seen in FIG. 2.

After cables 16 and bolt 52 have been positioned on base 12 as shown in FIG. 3, base 12 and cover 14 are urged toward one another, bending about hinge 42, to clamp cables 16 therebetween. Side walls 40 of cover 14 are spaced slightly wider apart than side walls 22 of base 12 so that the upper side walls 40 closely overlap the lower side walls 22 when bracket 10 is closed. Cable-receiving notches 48 in cover side walls 40 line up with cable-receiving notches 34 in base side walls 22 to form generally circular holes slightly smaller in diameter than the outer diameter of the respective coaxial cables 16. Accordingly, cable-receiving notches, 34,48 close tightly around the outer insulation 16a of cables 16, preferably digging into the insulation somewhat to assure a firm grip on the cables.

Locking tabs 36 are urged inwardly by cover side walls 40 as bracket 10 is closed, then spring back outwardly into engagement with respective rectangular apertures 50 to lock the cover 14 and base 12 in the closed condition. When in the closed condition of FIG. 3, retention tab 46 is adjacent the top of bolt head 52a to prevent bolt 52 from inadvertently being withdrawn from bolt receiving hole 28, and locator tabs 32 are closely adjacent lateral surfaces of the bolt head to prevent the bolt from rotating with respect to base 12.

When bracket 10 is folded closed, contacts 30,44 are urged against opposite sides of the exposed shield 16b of cables 16. Contacts 30,44 are then preferably soldered to shields 16b of their respective cables 16 to insure effective and long lasting electrical contact between bracket 10 and the cables. In an automated manufacturing operation, the soldering may be carried out approximately simultaneously with folding of bracket 10 to the closed position.

The tight grip of notches 34,40 around cable insulation 16a isolates the soldered connection between the shield 16b and the contacts 30,44 from physical stresses such as may be caused by any pulling on the cables, thus ensuring a reliable and long-lasting electrical connection. The reliability of the connection between cables 16 and bracket 10 is also improved because each cable is soldered to the bracket at two points: once to the contact 44 on cover 14, and once to contact 30 on base 12.

A bracket according to the invention may be adapted to receive any number of coaxial cables by increasing or decreasing the number of cable, receiving notches 34,48 and contacts 30,44 and, accordingly, the length of the bracket 10. The notches may be of any size as necessary to receive a cable of a particular diameter. It is also possible to replace contacts 30,44 with a single contact in either base 12 or cover 14 which is wide enough to contact and be soldered to the shields 16b of both cables.

In use, bracket 10 is attached to a grounding surface such as a metal vehicle panel 54 (see FIG. 4) by inserting the shank of bolt 52 through a hole 56 in the panel and tightening a nut 58 over the shank. Hook 26 projects around an edge 54a of panel 54 or into an aperture (not shown) in the panel to prevent rotation of the bracket 10 as nut 58 is tightened. Because hook 26 prevents rotation of bracket 10 relative to panel 54 and tabs prevent rotation of bolt 52 relative to the bracket, nut 58 may be tightened in a one handed operation. This capability may be valuable if the bracket 10 is to be installed in a location which is difficult to access. A plurality of small burrs 60 may be formed around bolt receiving hole 28, as best seen in FIG. 1. Burrs 60 have relatively sharp edges which score or cut into the surface of panel 54 slightly when nut 58 is tightened, thereby improving the electrical connection between the bracket 10 and the panel.

Bracket 10 may be formed from a single piece of electrically conductive metal by a stamping and bending process. FIG. 5 depicts a flat piece of stock as stamped to form the bracket 10 illustrated in FIGS. 1–4. For example, contacts 30,44 are preferably formed by cutting, stamping, or otherwise forming generally U-shaped holes 62 in base 12 and cover 14 to define the contacts and are subsequently bent away from the plane of the stamping. Such a manufacturing process is well suited to mass production and allows the invention bracket to be produced economically.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A grounding device for connecting at least one coaxial cable to an electrical ground, the device comprising:

first and second clamping members connected by a hinge, the clamping members movable relative to one another about the hinge to a clamped condition wherein the clamping members are closely adjacent one another and grip the cable therebetween;

a first contact disposed on one of the clamping members to contact a conductive portion of the cable when the clamping members are in the clamped condition;

means for securing the first clamping member to the electrical ground; wherein, the means for securing the first clamping member to the electrical ground comprises a bolt passing through a hole formed in the first clamping member, and further comprises means for preventing rotation of the bolt relative to the clamping members.

2. The grounding device according to claim 1 wherein the first and second clamping members and the hinge are formed from a single piece of electrically conductive material.

3. The grounding device according to claim 1 further comprising a second contact disposed on the other of the clamping members to contact the conductive portion of the cable when the clamping members are in the clamped condition.

4. The grounding device according to claim 1 wherein the bolt has a head and the means for preventing rotation of the bolt comprises at least one tab positioned on the first clamping member to contact the bolt head.

5. A grounding device for connecting at least one coaxial cable to an electrical ground, the device comprising:

first and second clamping members connected by a hinge, the clamping members moveable relative to one another about the hinge to a clamped condition wherein the clamping members are closely adjacent one another and grip the cable therebetween, the first clamping member comprising a base and at least one first wall extending therefrom, and the second clamping member comprising a base and at least one second wall extending therefrom, the first and second walls having respective notches formed therein, the first and second walls overlapping one another when the clamping members are in the clamped condition such that the notches form a passage to encircle the cable;

a first contact disposed on one of the clamping members to contact a conductive portion of the cable when the clamping members are in the clamped condition; and means for securing the first clamping member to the electrical ground.

6. The grounding device according to claim 5, wherein the passage formed by the respective notches in the first and second overlapping walls is a hole having a diameter smaller than an outer diameter of the cable which the passage encircles, such that the notches tightly grip an outer insulating portion of the cable.

7. A bracket for connecting a coaxial cable to an electrical ground comprising:

a base having an interior adapted to receive a portion of the cable and means for securing the bracket to the electrical ground;

a cover hingingly connected to the base for pivoting movement between an open position wherein the interior of the base is exposed and a closed position wherein the cover encloses the interior of the base;

a contact disposed on at least one of the base and the cover to make electrical contact with the cable portion when the cover is in the closed position; and complementary clamping means on the base and the cover for clamping the cable portion between the cover and the base when the cover is in the closed position.

8. The bracket according to claim 7 wherein the base and the cover are formed from a single piece of electrically conductive material connected by a living hinge.

9. The bracket according to claim 7 further comprising a second contact disposed on an other of the base and the cover to contact the conductive portion of the cable when the cover is in the closed position.

10. The bracket according to claim 7 wherein the means for securing the base to the electrical ground comprises a bolt passing through a hole formed in the base.

11. The bracket according to claim 10 wherein the means for securing the base to the electrical ground further comprises means for preventing rotation of the bolt relative to the base.

12. The bracket according to claim 11 wherein the bolt has a head and the means for preventing rotation of the bolt comprises at least one tab positioned on the base to contact the bolt head.

13. The bracket according to claim 7 wherein the clamping means comprises a first wall on the base and a second wall on the cover, the first and second walls having respective notches formed therein, the first and second walls overlapping one another when the cover is in the closed position such that the notches form a passage to encircle the cable.

14. The grounding device according to claim 13, wherein the passage formed by the respective notches in the first and second overlapping walls is a hole having a diameter smaller than an outer diameter of the cable which the passage encircles, such that the notches tightly grip an outer insulating of the cable.

15. A grounding device for connecting at least one coaxial cable to an electrical ground, the device comprising:

first and second clamping members connected by a hinge, the clamping members movable relative to one another about the hinge to a clamped condition gripping the cable therebetween;

the first clamping member comprising a base and a pair of spaced sidewalls extending from the base, and the second clamping member comprising a base and a pair of spaced sidewalls extending from the base, the spaced sidewalls of the first clamping member each having a cable-receiving notch formed therein and opening onto a cable-receiving edge of the respective sidewall, and the spaced sidewalls of the second clamping member each having a cable-receiving notch formed therein and opening onto a cable-receiving edge of the respective sidewall, the spacing of the spaced sidewalls on the first clamping member being greater than the spacing of the spaced sidewalls on the second clamping member such that the spaced sidewalls of the first and second clamping members are overlapped when the clamping members are in the clamped condition, and further wherein the notches in respective overlapped first and second spaced sidewalls are aligned in the clamped condition to form a passage for the coaxial cable, wherein the passage has a diameter less than an outer diameter of an insulating portion of the cable.

16. The grounding device of claim 15, wherein the cable-receiving notches of one of the clamping members are shallower than the cable-receiving notches on the other clamping member.

17. The grounding device of claim 15, wherein one of the clamping members has a solderable electrical contact connected at one end to the base and cantilevered inwardly to a free contact end located to contact the cable between the two cable-receiving notches in the sidewalls, the base further including an aperture through which the free end of the cantilevered contact can be soldered to an exposed conductive portion of the cable when the clamping members are in the clamped condition.

* * * * *